United States Patent Office 2,841,324
Patented July 1, 1958

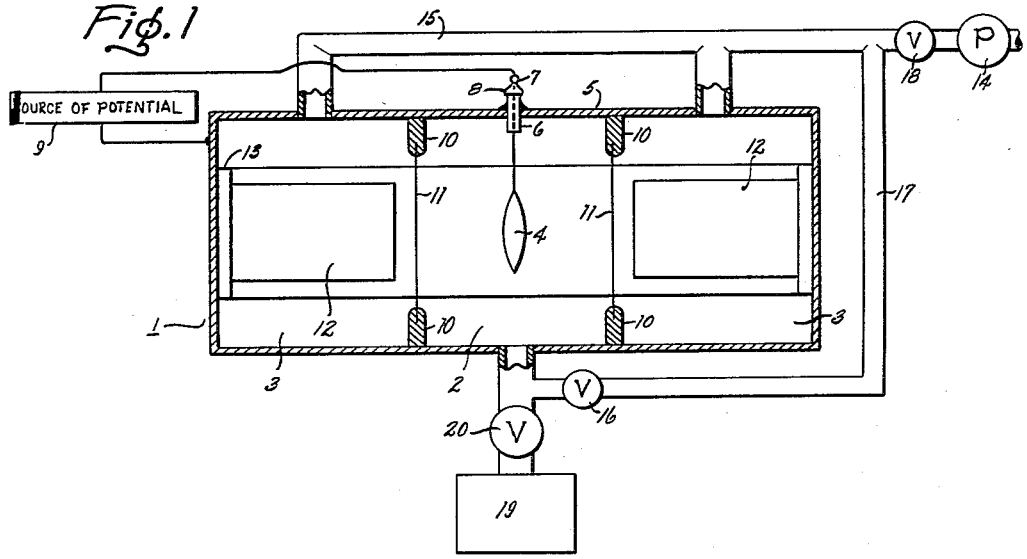
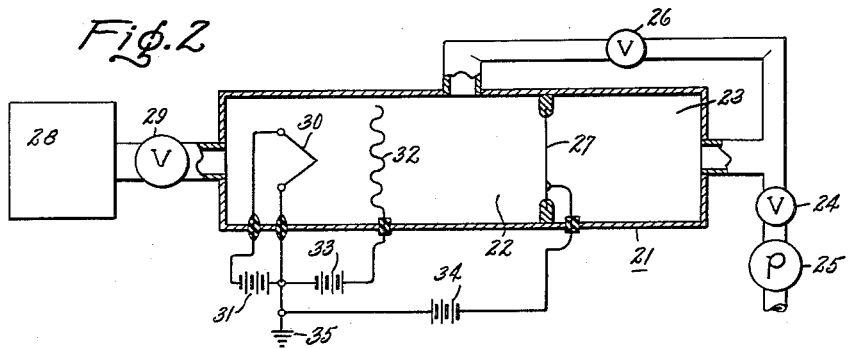
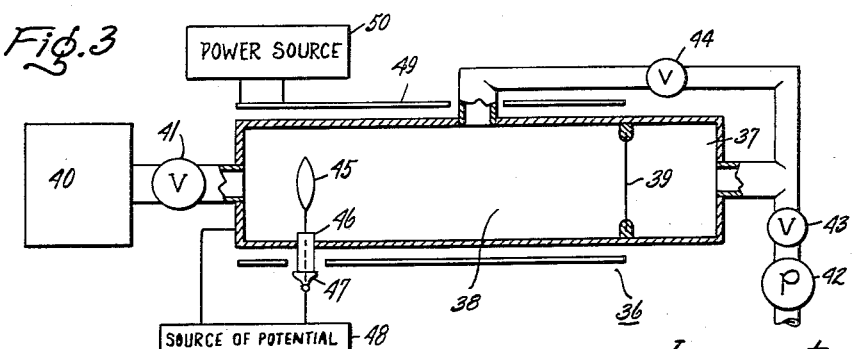

2,841,324

ION VACUUM PUMP

Donald J. Santeler, Scotia, N. Y., assignor to General Electric Company, a corporation of New York Application December 30, 1955, Serial No. 556,572

4 Claims. (Cl. 230—69)

My invention relates to ion vacuum pumps. More particularly my invention relates to ion vacuum pumps of novel and useful structure.

In achieving very low pressures or high vacuum in a container it is usual practice to utilize a rough or fine vacuum pump of conventional design to provide a reasonably low pressure or high degree of evacuation. Normally associated with the rough vacuum pump are one or more other pumps capable of achieving a much lower pressure such as diffusion pumps.

A typical ion vacuum pump as presently known comprises a pumping chamber in which a hot filament is used to provide electrons. These electrons are accelerated by usual means producing positive ions upon collision with gas molecules, the ions being removed as by electrostatic force through a small hole where they are neutralized and once again as gas molecules are removed by a rough vacuum pump. It has been found that the backstreaming of neutralized ions or gas molecules through the pumping hole into the ion pumping chamber reduces the effectiveness of pumping by this means.

Another ion vacuum pumping means utilizes the principle of getting or trapping gas ions or molecules on the surface of ion pumping chamber. The efficiency of this type of device, of course, depends upon the capacity of the chamber walls to absorb ions. As the material reaches its saturation point for ions or gas molecules, the pumping ability decreases sharply.

It is an object of my invention to provide an ion vacuum pump which positively and permanently pumps the gas being treated.

Briefly stated my invention comprises in an ion pumping chamber means for producing ions from gas molecules therein and means for directing these ions to a conductive or semi-conductive gas permeable membrane. Upon impact with the membrane the ions are converted to gas molecules which dissolve therein producing a concentration of gas in the upstream portion of the membrane. This produces a gas concentration gradient across the thickness of the membrane or diaphragm and the gas diffuses through the membrane to the downstream or rough vacuum side where it is desorbed and removed by the rough vacuum pump. This gas concentration gradient has been found to exist wherever the gas is soluble in or capable of permeating through the membrane, and in effect creates a high apparent pressure differential for permeation of the gas through the membrane even though the actual pressure in the ion vacuum chamber is lower than that in the rough vacuum chamber. Backstreaming of the gas from the rough vacuum chamber to the ion vacuum chamber is effectively resisted by the downstream-directed gas concentration gradient within the membrane, as well as by the solid or non-porous character of the membrane itself.

The features of my invention which I believe to be novel are set forth with particularity in the appended claims. My invention, itself, however, both as to its organization and method of operation, together with further objects and advantages thereof may best be understood from a consideration of the following description and the drawing in which Figs. 1 through 3 show side elevation cross-sectional views of typical embodiments of the invention.

Referring to Fig. 1 there is shown in cross-sectional side elevational view an ion vacuum pump 1 having an ion vacuum chamber 2 and rough or fore vacuum chambers 3, one on either side of ion vacuum chamber 2. Mounted within ion vacuum chamber 2 is an electrode 4 which is led through the wall 5 of the pump 1 by any suitable means such as tube 6, the electrode being insulated from and held in spaced relation from tube 6 at its terminal end 7 as by glass seal 8. Electrode 4 in this particular embodiment is of the cold type and is maintained at a suitable potential relative to the wall of the pump by means of a source of potential 9. Typically this potential difference is about 5,000 volts or upward although it may be lower and is either direct or alternating, although direct is preferred. Fixed to the wall 5 of the pump which may be of any cross-sectional shape such as round or rectangular are membrane mounting members 10 which are adapted to hold firmly in a gas-tight manner membranes 11.

Diaphragms or membranes 11 which are either of semi-conducting or conducting material are connected electrically to the pump wall or structure and will vary in composition depending upon the gas being pumped. It is well known that most gases will permeate or diffuse through various types of what appears to be solid material. For example it has been found that helium will diffuse through various polymers such as silicones and others. Helium will also diffuse through glass and fused silica. Hydrogen will diffuse through palladium, iron and other metals, as well as glass and polymers. Nitrogen will diffuse through steel and very slowly through glass. Oxygen has been found to diffuse through silver and the rare gases through polymers. Other gas permeable materials are known to those skilled in the art. Of course, more than one type of membrane may be utilized readily in any individual pump to pass selectively any desired number of gases.

The membrane may be of any removable thickness, for example, from one to fifty mils with an average or medium thickness of about 20 mils. Actually thinner membranes down to one mil thickness are preferred because of the greater pumping speed possible except that leaks are more likely to be present or develop in such thin members.

Mounted in rough vacuum chamber 3 and in such proximity to membranes 11 as to influence electrons and ions within the chamber are permanent magnet pole pieces 12 which are typically assembled in a base and yoke piece 13 attached to pump wall 5. The permanent magnets 12 may, of course, be replaced by electromagnets.

Rough vacuum chambers 3 are connected to rough vacuum pump 14 which may be of any usual type by conduit system 15. Ion vacuum chamber 2 is connected to conduit system 15 through valve 16 by a conduit 17. Valve 18 may be inserted just upstream of rough or fore vacuum pump 14. The chamber, vessel or container 19 to be evacuated or from which gas is to be pumped is connected to conduit system 17 through valve 20.

In operating the pumping system of Fig. 1 with the chamber 19 to be evacuated connected to the system, valves 16, 18 and 20 are opened and rough vacuum pump 14 actuated to evacuate or pump as much gas as possible from the system. When pump 14 has reached the limit of its ability, valve 16 is closed isolating ion vacuum chamber 2 from direct contact with pump 14, and the source of potential 9 is actuated. Actuation of potential source 9 causes electrode 4 to attract electrons to its surface which electrons are caused by magnet poles 12 to proceed in a spiral fashion toward electrode 4 whereby the probability of their colliding with gas molecules is increased. The gas ions produced by such collision under magnetic influence traverse a space entirely limited vertically and laterally by the extent of the magnetic pole piece surfaces toward membranes 11. In order that as little as possible membrane area be outside this area or unacted upon by ions, the diaphragms 11 are made substantially of the same area as the pole pieces 12 and in line therewith. This, in addition to the difficulty of back diffusion of gas molecules through a solid diaphragm, prevents back diffusion by affording little or no inactive diaphragm area for diffusion to take place.

As the electrons proceed toward electron 4 they, upon colliding with any gas molecules, convert the latter to ions. These ions having a positive electric charge are influenced by the electric and magnetic field and proceed with accelerated and directed speed toward membranes 11 colliding therewith and being adsorbed thereon. At the same time the ions lose their charge once again becoming gas molecules. The speed of the colliding ions is such that as they are adsorbed as gas molecules, a concentration of dissolved molecules is created in the upstream or ion vacuum chamber side of the membranes. This concentration of gas molecules produces a gas molecule concentration gradient through the membranes which in turn produces an effect, due to the continued ion bombardment and dissolution of molecules, which is equivalent to that obtained were the pressure increased in the ion chamber. For example, it has been found that with an actual pressure of 0.1 micron of mercury in the ion chamber and a pressure of 10 microns of mercury in the rough vacuum chamber, the ion bombardment and the gas molecule concentration gradient set up in the membrane is equivalent to a pressure in the ion vacuum chamber of several millimeters of mercury. Acting under such pressure the dissolved gas molecules permeate or pass through the membranes to the rough vacuum chamber whence they are removed by the action of the rough vacuum pump. In effect we have a situation where gas flows from a low pressure ion chamber to a rough vacuum chamber which is at a higher pressure.

There is little or no back permeation of gas molecules through the membranes from the rough vacuum chamber to the ion vacuum chamber because of the solid nature of the membrane and because of the gas molecule concentration gradient in the membrane which opposes any tendency toward such back migration. This is as contrasted to prior art devices in which actual open passages are available for such migration. Any tendency toward back migration is further counteracted by having substantially the entire area of the membrane under the influence of the magnetic flux.

It will be apparent to those skilled in the art that various materials may be used in the membranes to permit the passage of certain gas selectively or to permit permeation of a number of gases at once. By this, all or part of the gas molecules of different kinds may be pumped out of a system. It is well known, for example, that helium permeates readily through resinous polymers, glass and fused silica, whereas it permeates to little or no extent through metals and crystalline silica or quartz. The rare gases also permeate through resinous polymers and little or not at all through metals. Neon also permeates through glass along with helium. Hydrogen permeates readily through palladium, iron and other metals, as well as glass and polymers. Silver may be utilized as a membrane through which oxygen will permeate. Other gas permeable materials are known to those skilled in the art.

It will also be apparent that a plurality of membranes may be used in a single apparatus to pump a variety of gas molecules, each type of molecule, or a number of types of molecules through such membrane.

It is preferred that membranes 11 be conductive or at least have a conductive surface to obviate the building up thereon of an electrostatic charge which would detract from the operation of the device. Conducting synthetic rubbers are typical of suitable membrane material, as of course are the metals. Non-conductive materials may be given a conductive surface in various manners as by preparing thereon a very thin layer of metal by well known means. Conductive screening may also be fixed on the surface of the membrane.

A second embodiment or apparatus utilizing my invention is depicted in Fig. 2. Here the apparatus 21 has an ion vacuum chamber 22 and a rough vacum chamber 23. The rough vacuum chamber is connected through valve 24 to fore vacuum pump 25 and ion vacuum chamber 22 is also connected to the pump through valve 26. Permeable membrane 27 of a suitable material for the particular gas or gases to be pumped serves as a barrier between the two vacuum chambers. The chamber or vessel 28 is connected to ion vacuum chamber 22 through valve 29. Mounted in the ion vacuum chamber 22 is a filament 30 of the hot type shown conventionally which serves as a source of electrons and is energized by power source 31. A grid 32 energized by power source 33 is placed between filament 30 and membrane 27. The membrane 27 is connected in circuit through power source 34 as shown, the circuit being grounded at 35.

In operation, the grid 32 is preferably maintained in any well known manner at a potential of at least about 200 volts higher than filament 30 while membrane 27 is maintained at a potential at least five volts below that of filament 30.

In operating the device of Fig. 2 with the receptacle 28 connected in place and valves 29, 26, and 24 open, pump 25 is actuated to pump gas from the system to the limit of its ability. At this point valve 26 to the ion vacuum chamber is closed and the filament 30, grid 32 and membrane 27 energized. When energized, filament 30 emits electrons which pass through and are accelerated by grid 32 proceeding downstream toward membrane 27. The electrons collide with molecules of gas remaining in the ion vacuum chamber producing gas ions which collide with and are absorbed on the upstream surface of membrane 27 becoming once again gas molecules. As explained above in connection with the device of Fig. 1, the gas molecules dissolve in the membrane producing a concentration gradient across the membrane, this concentration and the continual ion bombardment creating an apparent higher pressure on the upstream side of the membrane than exists on the downstream side. As a result, the gas molecules permeate through the membrane to the rough vacuum side where they are desorbed and removed by the rough vacuum pump.

A still further embodiment of my invention is shown in Fig. 3. Here the device 36 has a rough vacuum chamber 37 separated from an ion vacuum chamber 38 by a membrane 39 of the type described above. The vessel or system 40 to be evacuated is connected to the ion chamber through valve 41. As above, rough vacuum chamber 37 and ion chamber 38 are connected to a pump 42 through valves 43 and 44 respectively. Mounted within ion chamber 38 is an electrode 45 of the cold type which extends through the wall of the device through tube 46 from which it is spaced and insulated at the outer end of the tube by a glass or other suitable seal 47. Electrode 45 is energized by a source of potential 48. Surrounding the device 36 is an electromagnetic coil 49 energized by power source 50.

In operating the device of Fig. 3, valves 41, 43 and 44 are opened and pump 42 actuated. When the system has been evacuated as far as pump 42 can do so, valve 44 is closed isolating the ion vacuum chamber 38 from the pump and rough vacuum chamber 37 and electrode 45 and magnetic coil 49 energized. Electrons in the system are accelerated by the electric field and collide with gas molecules remaining in the ion vacuum chamber producing gas ions. These gas ions in turn are accelerated downstream by the electric field and collimated by the field produced by coil 45 where they collide with or bombard the membrane 39 and are adsorbed thereon reverting to gas molecules. As in the previous embodiments a gas concentration gradient is built up in the membrane, which along with the ion bombardment, produces a relatively high apparent pressure effect on the upstream of the membrane which urges the gas molecules through the permeable membrane whence they are removed by the rough vacuum pump.

The above particular embodiments of my invention are typical of those which may be constructed. However, they are not to be taken as limiting. The crux of my invention is the provision in a system as described of a solid membrane which will permit the diffusion of gas therethrough in combination with means to ionize and accelerate gas molecules in the ionic vacuum chamber whereby such ions bombard the membrane and create a gas pressure gradient therein which produces an apparent higher pressure in the ion vacuum chamber than in the rough vacuum chamber although in actuality the pressure ratio is in the reverse sense. This apparent pressure causes the gas to permeate the membrane whence it may be removed by a rough vacuum pump. Any source of electrons may be used as desired and likewise any suitable means may be utilized for accelerating and directing the electrons and ions toward the membrane. Any usual rough vacuum pump may be used although, of course, one producing a higher vacuum will ease the role of the ion pumping system provided.

My invention is a definite advance over prior art devices in that the gas molecules are irrevocably removed from the ion vacuum chamber and pumped from the system. This is in contrast to prior devices in which ions were removed through an opening or aperture through which they could readily backstream. It is also a great advance over so-called gettering methods or filters in which case the ions are held on a surface or in a device or filter which soon becomes so clogged or saturated that no more ions can adhere thereto.

As pointed out above, by choosing a membrane or membranes of proper materials, my invention can be used to pass a plurality of gases or to selectively pass any particular gas as desired.

While I have described certain specific embodiments of my invention, I wish it to be understood that I desire to protect in the following claims all changes or modifications thereto which fall within the spirit and scope of those claims.

What I claim as new and desire to secure by Letters Patent of the United States is:

1. An ion vacuum pump comprising means defining first and second vacuum chambers maintained at different pressures, solid membrane means separating said chambers, means positioned in the chamber maintained at the lower pressure to ionize gas molecules, means to produce a field within said last chamber to direct said ions toward and into said membrane means to establish a localized gas concentration gradient whereby the gas molecules diffuse through said membrane from the lower to the higher pressure chamber.

2. An ion vacuum pump comprising means defining a rough vacuum chamber maintained at a first pressure, means defining an ion vacuum chamber maintained at a second lower pressure, solid conductive gas membrane means separating said chambers, means positioned in said ion chamber to ionize gas molecules, means to produce an electric field within said ion chamber to direct said ions toward and into said membrane to establish a localized concentration gradient whereby the gas molecules diffuse through said membrane from the lower to the higher pressure.

3. An ion vacuum pump comprising means defining a rough vacuum chamber maintained at a first pressure, means defining an ion vacuum chamber maintained at a second lower pressure, a solid, non-porous conductive gas permeable membrane means separating said chambers, means positioned in said ion vacuum chamber for ionizing gas molecules, means for producing an electric field within said ion vacuum chamber for directing said ions toward and into said membrane means, and magnetic means for collimating said ions whereby a localized gas concentration gradient is produced at the surface of the membrane means and said gas molecules diffuse through said membrane from the chamber maintained at the lower pressure to the one maintained at the higher pressure.

4. An ion vacuum pump comprising means defining a rough vacuum chamber maintained at a first pressure, means defining an ion vacuum chamber maintained at a second lower pressure, a solid, non-porous gas permeable membrane means separating said chambers, means positioned in said ion vacuum chamber for ionizing gas molecules, electric field means positioned within said ion vacuum chamber for accelerating said ions toward said membrane, and an electromagnetic coil surrounding said ion chambers for collimating said accelerated ions, whereby said ions strike said membrane and diffuse therethrough from the lower to the higher pressure chamber.

References Cited in the file of this patent

UNITED STATES PATENTS

| | | |
|---|---|---|
| 2,085,735 | Brion et al. | July 6, 1937 |
| 2,137,198 | Smith | Nov. 15, 1938 |
| 2,282,401 | Hansel | May 12, 1942 |
| 2,460,175 | Hergenrother | Jan. 25, 1949 |
| 2,636,664 | Hertzler | Apr. 28, 1953 |
| 2,755,014 | Westendorp et al. | July 17, 1956 |